July 11, 1939.  F. M. WILLIAMSON  2,165,599
WIPER FOR VANITY CASE MIRRORS
Filed Oct. 14, 1937
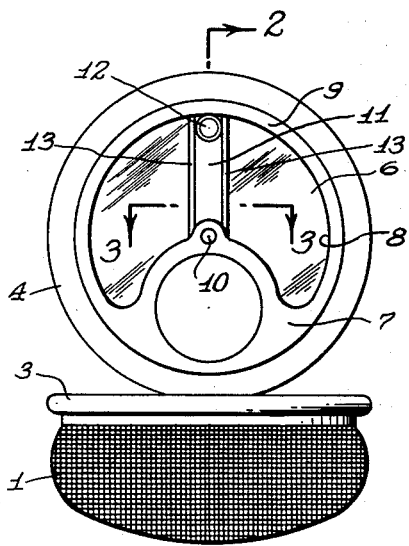
Fig. 1.
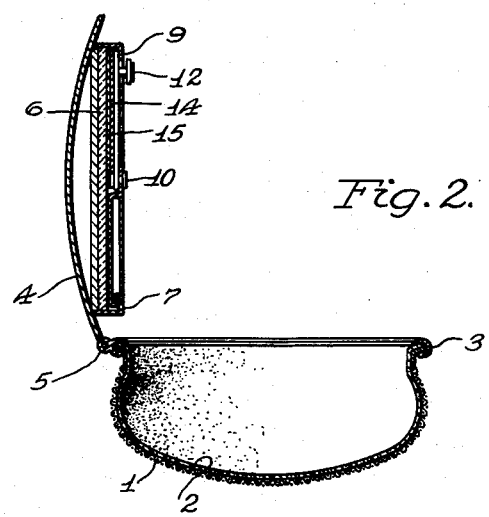
Fig. 2.
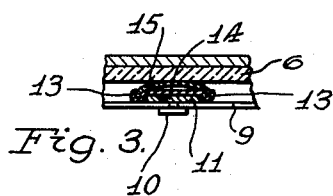
Fig. 3.
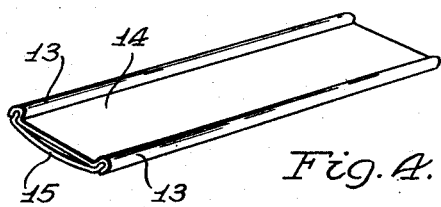
Fig. 4.
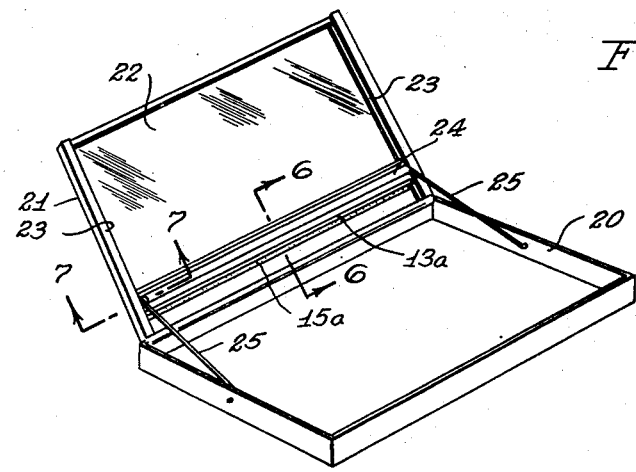
Fig. 5.
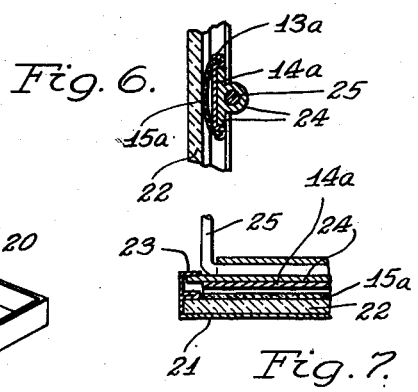
Fig. 6.
Fig. 7.
Inventor
Floyd M. Williamson
By
Attorneys

Patented July 11, 1939

2,165,599

UNITED STATES PATENT OFFICE 2,165,599

WIPER FOR VANITY CASE MIRRORS

Floyd M. Williamson, Detroit, Mich.

Application October 14, 1937, Serial No. 168,855

8 Claims. (Cl. 132—83)

This invention relates to mirror wipers for vanity cases. Vanity cases embody a mirror which usually becomes obscured by the collection of powder or cosmetics thereon and it is necessary, in order that the mirror may be used, that the powder be removed therefrom. In my prior Patent No. 2,005,835 of June 25, 1935, any my co-pending application Serial No. 166,391, filed September 29, 1937, I have disclosed and claimed different structural arrangements for accomplishing this general purpose, and this invention relates to improvements in the wiper construction.

As shown in my prior patent and application above referred to, a wiper element is carried by a member which moves across the face of the mirror automatically incident to opening and closing movement of relatively hinged parts of a vanity case, thereby wiping the mirror. In the present case, the invention specifically concerns the wiper member and the object is to provide a wiper suitable for use in a vanity case of the automatic wiping type, above referred to, and which also is adapted for use in a vanity case wherein the wiper moving member is adapted to be manually moved after the case is opened.

More specifically, an object of the invention is to provide a wiper for use with a member movable across the face of a mirror wherein said member is retained or guided so that it moves in a plane parallel to but slightly spaced from the face of the mirror. This member comprises a bar. The wiper proper comprises a channel shaped element with a chamois secured to the face thereof and maintained in wiping contact with the mirror by the bar. The bar is disposed in the channel formation whereby one edge of the bar presses the wiper against the mirror while its two side edges engage respective sides of the channel formation to cause movement of the wiper with the bar.

It has been found through experience that chamois constitutes a most efficient wiper and that when it is in a loose condition, rather than taut, its wiping function is greatly improved. Accordingly, it is another object of the invention to provide means for supporting a chamois in a loose condition and for contact with the mirror, said means comprising a metallic strip deformed along its edges to provide groove formations, the edges of the chamois being disposed in and retained in the grooves by deformation of the walls of the latter.

With the above and other ends in view the invention is more fully disclosed with reference to the accompanying drawing, in which—

Figure 1 is a front elevation of a compact case, the cover thereof being shown in an open position;

Figs. 2 and 3 are sections taken respectively on lines 2—2 and 3—3 of Fig. 1;

Fig. 4 is a perspective view of the wiper;

Fig. 5 is a perspective view of another type of compact case, illustrating the invention in connection therewith;

Figs. 6 and 7 are sections taken respectively on lines 6—6 and 7—7 of Fig. 5.

Like characters of reference are employed throughout to designate corresponding parts.

The compact shown in Figs. 1 and 2 includes a mesh bag 1 having a liner 2 formed of chamois, imitation leather or other suitable fabric, the mesh bag and liner both being secured to an annular metallic member 3. A cover 4 is hinged to the metallic member 3 by the hinge 5 and has a mirror 6 mounted thereon by a dished plate 7. The plate 7 has an opening 8 therein through which a portion of the mirror is exposed, and although this opening is shown as having a substantially moon-shape, it will be readily understood that it might take other forms. The opening 8 is so formed, however, that a portion of the plate forms an arcuate lip 9 having a center of curvature substantially coinciding with the center of the circular cover 4.

Pivoted at the center of curvature of the lip 9, by a pin 10, is a swinging arm 11, the outer swinging end of which extends beneath the lip 9. A finger piece 12 is mounted upon the arm 11 whereby it may be manually swung about its pivot. As may be readily seen upon reference to Fig. 2 the pivot 10 and the lip 9 confine swinging movement of the arm to a plane parallel to the face of the mirror and spaced slightly therefrom. The arm 11 carries a wiping element.

The wiping element, as shown more clearly in Fig. 4, comprises a metallic strip bent along its edges to provide two groove formations 13, the formations being disposed entirely above the bottom face of the strip whereby they provide a channel 14 on top of the strip. A wiper 15, preferably of chamois, has its edges received in the groove formations 13, and the groove formations are deformed to pinch and tightly retain the edges therein. As shown somewhat exaggerated, the chamois is in a loose condition, or in other words, is not drawn taut across the face of the metal strip.

The wiper is assembled with respect to the swinging arm 11 as shown more clearly in Fig. 3. The arm 11 extends through the channel 14, engages the bottom thereof to press the wiper into contact with the mirror, and engages the sides thereof, or the groove forming portions 13, to cause movement of the wiper with the bar when the latter is moved.

In Fig. 5 there is shown a vanity case similar to those shown in the patent and application above identified. It comprises two relatively hinged parts 20 and 21, the part 21 comprising the cover and having a mirror 22 mounted thereon. Guides 23 are disposed at opposite sides of the mirror and a bar 24 is supported in said guides and is connected by links 25 to the case part 20 whereby it moves across the face of the mirror automatically incident to relative movement between the parts 21 and 20.

The wiper 15a constructed identically to that above described is assembled on the bar 24 so that the bar engages the bottom of the channel formation 14a to hold the wiper against the mirror and the groove forming portions 13a to cause movement of the wiper with the bar.

What I claim is:

1. For use with a vanity case having a mirror, and a member movable across the face of the mirror, a wiper, said wiper comprising a metallic member with a channel on one face and a wiping member on its other face, said channel being adapted to receive the movable member behind said wiping member whereby the movable member causes pressure on said wiping member and movement thereof.

2. For use with a vanity case having a mirror, and a member movable across the face of the mirror, a wiper, said wiper comprising a metallic member with a channel directed outwardly from the mirror and a wiping member supported on the mirror, said wiping member being supported by said metallic member loosely with respect thereto, said channel being adapted to receive said movable member whereby the latter causes movement thereof.

3. For use with a vanity case having a mirror and a member movable across the face thereof, a wiper, said wiper comprising a metallic strip and a wiping fabric, said strip having a substantially flat central portion and deformed portions at its edges for retaining the fabric thereon, said deformed portions being disposed whereby they are adapted to be engaged therebetween by the movable member to cause movement of the wiper therewith.

4. For use with a vanity case having a mirror and a member movable across the face thereof, a wiper, said wiper comprising a flat metallic strip and a wiping fabric, said strip having marginal deformed portions retaining the fabric thereat, said deformed portions supporting said fabric in a loose or tension-free condition therebetween, said deformed portions being disposed whereby they are adapted to be engaged therebetween by the movable member to cause movement of the wiper therewith.

5. For use with a vanity case having a mirror and a member movable across the face of the mirror, a wiper, said wiper comprising a metallic element having a channel adapted to receive the movable member and repressed thereby against the mirror face and to be moved thereacross, and a flexible wiping member secured to said metallic element in a loose or tension-free condition on the side of said element opposite said channel.

6. For use with a vanity case having a mirror and a member movable across the face of the mirror, a wiper, said wiper comprising a substantially flat metallic strip and a flexible wiping element, said strip having marginal groove forming portions directed toward the mirror for receiving the edges of said wiping element, and being deformed to retain said edges therein, said groove forming portions thereby providing a channel directed away from the mirror which is adapted to be engaged by the movable member to cause movement of the wiper therewith and pressure thereon.

7. For use with a vanity case having a mirror and a member movable across the face of the mirror, a wiper, said wiper comprising a metallic strip and a flexible wiping element, the said strip having marginal groove forming portions receiving the edges of said wiping element and defining a channel on the opposite side of said strip between said portions, said portions being deformed to retain said edges therein, said channel extending longitudinally of said strip and being adapted to be engaged by the movable member to cause movement of the wiper therewith, and said portions being disposed whereby they support the wiping element in a loose or tension-free condition.

8. In combination, a vanity case, said case having relatively movable parts and a mirror in one part, a member movable across the face of the mirror, means connecting said member to the other case part for movement automatically incident to relative movement of the two parts, and a wiper carried by said movable member, said wiper comprising a metallic member with a channel on one face and a wiping member on its other face, said channel being adapted to receive said movable member behind said wiping member whereby the latter is caused to be passed against the mirror by said movable member and to be moved thereby.

FLOYD M. WILLIAMSON.